US011246090B2

United States Patent
Yu et al.

(12) United States Patent
(10) Patent No.: US 11,246,090 B2
(45) Date of Patent: Feb. 8, 2022

(54) DATA COMMUNICATION METHOD AND DEVICE

(71) Applicant: Huawei Technologies Co., Ltd., Guangdong (CN)

(72) Inventors: Haifeng Yu, Beijing (CN); Xin Xiong, Beijing (CN); Feng Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/366,126

(22) Filed: Mar. 27, 2019

(65) Prior Publication Data

US 2019/0223095 A1   Jul. 18, 2019

Related U.S. Application Data

(63) Continuation of application No. PCT/CN2017/103001, filed on Sep. 22, 2017.

(30) Foreign Application Priority Data

Sep. 28, 2016   (CN) .......................... 201610867988.0

(51) Int. Cl.
*H04W 56/00*   (2009.01)
*H04W 48/20*   (2009.01)
(Continued)

(52) U.S. Cl.
CPC ............ *H04W 48/20* (2013.01); *H04W 8/22* (2013.01); *H04W 36/00* (2013.01); *H04W 36/02* (2013.01);
(Continued)

(58) Field of Classification Search
CPC ..... H04W 48/20; H04W 36/00; H04W 74/08; H04W 36/02; H04W 80/02;
(Continued)

(56) References Cited

U.S. PATENT DOCUMENTS 9,264,961 B1    2/2016  Shah et al.
2013/0188612 A1* 7/2013 Dinan ................. H04W 72/042
                                                370/336
(Continued)

FOREIGN PATENT DOCUMENTS

CN   103167574 A   6/2013
CN   103843425 B   6/2014
CN   105580457 A   5/2016

OTHER PUBLICATIONS

Mikko, Jun. 2016, (Mobile and wireless communications—Asynchronous Control Functions and Overall Control Plane Design).*
(Continued)

*Primary Examiner* — Lakeram Jangbahadur
(74) *Attorney, Agent, or Firm* — Slater Matsil, LLP

(57) ABSTRACT

The present disclosure discloses a data communication method and a device, to resolve a prior-art problem of a high latency for switching a terminal device from an idle mode to a connected mode. The method includes: prestoring, by a terminal device, a TA indication list of a group of cells; performing, by the terminal device, cell selection or reselection, and obtaining a cell identity of a cell obtained after the selection or reselection; querying, by the terminal device based on the cell identity, the TA indication list of the group of cells for a TA value corresponding to the cell identity; and if the terminal device successfully finds, in the TA indication list of the group of cells, the TA value corresponding to the cell identity, sending, by the terminal device, an uplink Radio Resource Control (RRC) message in a random access-free manner.

12 Claims, 6 Drawing Sheets

(51) Int. Cl.
| | |
|---|---|
| *H04W 36/08* | (2009.01) |
| *H04W 76/27* | (2018.01) |
| *H04W 36/02* | (2009.01) |
| *H04W 74/08* | (2009.01) |
| *H04W 36/00* | (2009.01) |
| *H04W 76/11* | (2018.01) |
| *H04W 8/22* | (2009.01) |
| *H04W 80/02* | (2009.01) |

(52) U.S. Cl.
CPC ......... *H04W 36/08* (2013.01); *H04W 56/001* (2013.01); *H04W 56/0045* (2013.01); *H04W 74/08* (2013.01); *H04W 74/0833* (2013.01); *H04W 76/11* (2018.02); *H04W 76/27* (2018.02); *H04W 80/02* (2013.01)

(58) Field of Classification Search
CPC . H04W 74/0833; H04W 56/001; H04W 8/22; H04W 76/11; H04W 76/27; H04W 56/0045; H04W 36/08; H04W 48/12; H04W 60/04; H04W 36/023; H04W 36/0088

See application file for complete search history.

(56) References Cited

U.S. PATENT DOCUMENTS

| | | | |
|---|---|---|---|
| 2014/0029586 A1* | 1/2014 | Loehr | H04B 3/36 370/336 |
| 2014/0308956 A1 | 10/2014 | Zhang et al. | |
| 2015/0223184 A1* | 8/2015 | Bergstrom | H04W 72/0446 370/329 |
| 2016/0219547 A1 | 7/2016 | Seo et al. | |
| 2017/0230843 A1* | 8/2017 | Ouchi | H04B 7/063 |
| 2017/0265227 A1* | 9/2017 | Wang | H04W 72/04 |

OTHER PUBLICATIONS

3rd Generation Partnership Project;Technical Specification Group Radio Access Network; Study on Scenarios and Requirements for Next Generation Access Technologies; (Release 14), 3GPP TR 38.913 V0.4.0 (Jun. 2016), 35 pages.

* cited by examiner

DATA COMMUNICATION METHOD AND DEVICE

CROSS-REFERENCE TO RELATED APPLICATIONS

This application is a continuation of International Application No. PCT/CN2017/103001, filed on Sep. 22, 2017, which claims priority to Chinese Patent Application No. 201610867988.0, filed on Sep. 28, 2016. The disclosures of the aforementioned applications are hereby incorporated by reference in their entireties.

TECHNICAL FIELD

This application relates to the field of communications technologies, and in particular, to a data communication method and a device.

BACKGROUND

As the 4th generation mobile communications technology (4G) enters a stage of large-scale commercial use, a future 5th generation mobile communications technology (5G) has become a focus of global research. 5G service requirements are diversified, and will greatly affect living, working, leisure, transportation, and other fields of people. In 3rd Generation Partnership Project (3GPP) technical report (TR) 38.913, 5G application scenarios are classified into three types: enhanced mobile broadband (eMBB), massive machine type communications (mMTC), and ultra-reliable and low latency communications (URLLC). In 3GPP TR 38.913, requirements on a latency and reliability of communication between user equipment (UE) and an evolved NodeB (eNB) in the URLLC scenario are as follows: A control-plane target latency is 10 ms, and reliability is $10^{-5}$.

In the prior art, LE can communicate with an eNB only when the UE enters a connected mode, and when the UE is switched from an idle state to the connected mode, a control-plane signaling interaction process is complex and a latency is relatively high. To increase a speed of entering, by the UE, a Radio Resource Control (RRC) connected mode, an RRC resume technology is introduced in Long Term Evolution (LTE) R13. In an RRC resume process, the eNB stores a UE context, suspends but does not end an RRC connection to the UE, and configures a resume ID for the UE. When the UE is to resume the RRC connection to the eNB, the UE sends an RRC connection resume request message, where the RRC connection resume request message carries the resume ID. After receiving the resume ID, the eNB may send the corresponding UE context to the UE, to quickly resume the RRC connection between the UE and the eNB. Before the RRC connection is resumed, to ensure that uplink signals sent by the UE can synchronously arrive at the eNB, the UE needs to obtain a timing advance (TA) value before accessing a cell for uplink data transmission. Each time when performing uplink transmission in the cell, the UE sends uplink data a TA ahead, so that the uplink data arrives at the eNB exactly at a specified time. However, different cells may have different TA values. Therefore, before sending an RRC connection resume request message to a cell, the UE needs to initiate a random access (RA) process, to obtain a TA value of the cell. The random access process needs to occupy a specific time period, increasing a control-plane latency, that is, increasing an RRC connection resume time.

To sum up, in the prior art, it is difficult to implement a control-plane target latency of 10 ms. How to reduce a latency for switching the LIE from an idle mode to a connected mode is a problem to be resolved currently.

SUMMARY

The present disclosure is to provide a data communication method and a device, to resolve a prior-art problem of a high latency for switching a terminal device from an idle mode to a connected mode.

According to a first aspect, an embodiment of the present disclosure proposes a data communication method. The method includes: prestoring, by a terminal device, a TA indication list of a group of cells; performing, by the terminal device, cell selection or reselection, and obtaining a cell identity of a cell obtained after the selection or reselection; querying, by the terminal device based on the cell identity, the TA indication list of the group of cells for a TA value corresponding to the cell identity; and if the terminal device successfully finds, in the TA indication list of the group of cells, the TA value corresponding to the cell identity, sending, by the terminal device, an uplink Radio Resource Control (RRC) message in a random access-free manner, where sending the uplink RRC message in the random access-free manner is directly sending, by the terminal device based on the TA value, the uplink RRC message to a network device that provides a service for the cell.

In this embodiment of the present disclosure, the TA indication list of the group of cells includes a cell whose TA value is zero, and the cell whose TA value is zero may be a cell whose cell radius is relatively small. The terminal device may select a cell in which the terminal device is originally located, or when a radio link failure, a radio resource reconfiguration failure, or a handover failure occurs between the terminal device and the cell in which the terminal device is originally located, the terminal device needs to reselect, from the group of cells, another cell different from a cell in which the terminal device is located. The uplink RRC message is an RRC connection resume request message, connection setup request message, or connection reestablishment request message, and the terminal device sends the uplink RRC message in a contention access manner.

In this embodiment of the present disclosure, the terminal device queries the stored TA indication list of the group of cells for the TA value corresponding to the cell identity of the cell obtained after the selection or reselection, and sends, based on the TA value, the uplink Radio Resource Control (RRC) message in the random access-free manner without a need to obtain the TA value by using a random access process. This reduces a latency for switching the terminal device from an idle mode to a connected mode.

In a possible design, before the terminal device prestores the TA indication list of the group of cells, the terminal device receives the TA indication list of the group of cells sent by the network device, where the TA indication list of the group of cells may be carried in a broadcast message or a control message that is sent by the network device and that is received by the terminal device, and the control message is an RRC connection release message or a Medium Access Control control element.

In a possible design, the TA indication list of the group of cells may alternatively be generated by the terminal device based on historical residence information.

In a possible design, before the receiving, by the terminal device, the timing advance (TA) indication list of the group of cells sent by the network device, the method further includes: detecting, by the terminal device, a downlink synchronization message sent by the network device.

In this embodiment of the present disclosure, the terminal device detects the downlink synchronization message sent by the network device, to complete downlink synchronization with the network device.

In a possible design, before the prestoring, by a terminal device, a TA indication list of a group of cells, the method further includes: reporting, by the terminal device, first information to the network device, where the first information indicates whether the terminal device has a capability of supporting random access-free uplink synchronization.

In this embodiment of the present disclosure, when the terminal device has the capability of supporting the random access-free uplink synchronization, the terminal device is a static terminal device or a dynamic terminal device. When the terminal device is a dynamic terminal device, the broadcast message or the control message carries both the TA indication list of the group of cells and a timer that is used to indicate a validity period of the TA indication list of the group of cells.

In a possible design, the TA indication list of the group of cells includes a cell identity and a TA value corresponding to the cell identity.

In a possible design, the TA indication list of the group of cells further includes a common resource pool corresponding to the group of cells, and a resource in the common resource pool is used by the terminal device to send the uplink RRC message.

In this embodiment of the present disclosure, the terminal device does not perform a process of requesting an uplink resource through random access, to educe signaling and a latency, and improve efficiency of sending the uplink RRC message.

In a possible design, the TA indication list of the group of cells further includes a resource pool corresponding to the cell identity, and a resource in the resource pool is used by the terminal device to send the uplink RRC message.

In this embodiment of the present disclosure, the resource used by the terminal device to send the uplink RRC message is corresponding to the cell identity, to reduce transmission collision due to resource sharing between cells, and improve efficiency of sending the uplink RRC message.

In a possible design, the directly sending, by the terminal device based on the TA value, the uplink RRC message to a network device that provides a service for the cell includes: sending, by the terminal device, the uplink RRC message based on the TA value and by using the resource in the common resource pool or the resource in the resource pool corresponding to the cell identity.

In this embodiment of the present disclosure, the uplink RRC message may be sent for a plurality of times by using the resource in the common resource pool or the resource in the resource pool corresponding to the cell identity, to improve a success rate of sending the uplink RRC message.

In a possible design, the common resource pool or the resource pool corresponding to the cell identity may be predetermined by the terminal device.

According to a second aspect, an embodiment of the present disclosure proposes a data communication method. The method includes: configuring, by a network device, a timing advance (TA) indication list of a group of cells for the terminal device; and sending, by the network device, the TA indication list of the group of cells to the terminal device.

In this embodiment of the present disclosure, the TA indication list of the group of cells may be carried in a broadcast message or a control message sent by the network device, where the control message is a Radio Resource Control connection release message or a Medium Access Control control element.

In this embodiment of the present disclosure, the network device configures the TA indication list of the group of cells for the terminal device; and the terminal device queries the TA indication list of the group of cells for a TA value corresponding to a cell identity of a cell obtained after selection or reselection, and sends, based on the TA value, an uplink Radio Resource Control (RRC) message in a random access-free manner without a need to obtain the TA value by using a random access process. This reduces a latency for switching the terminal device from an idle mode to a connected mode.

In a possible design, after the sending, by the network device, the TA indication list of the group of cells to the terminal device, the method further includes: receiving, by the network device, an uplink Radio Resource Control (RRC) message that is sent by the terminal device in a random access-free manner, where the random access-free means that the network device directly receives the uplink RRC message.

In this embodiment of the present disclosure, when the terminal device selects an original cell, the network device receives the uplink RRC message sent by the terminal device; or if the terminal device reselects, in the group of cells, another cell different from the original cell, a network device that provides a service for the reselected another cell receives the uplink RRC message sent by the terminal device.

In a possible design, before the configuring, by a network device, a TA indication list of a group of cells for a terminal device, the method further includes: receiving, by the network device, location information of the terminal device and first information that is reported by the terminal device, where the first information indicates whether the terminal device has a capability of supporting random access-free uplink synchronization. The network device configures the TA indication list of the group of cells for the terminal device based on the location information and the first information.

In this embodiment of the present disclosure, the location information is obtained by the network device through reporting of the terminal device, or obtained by the network device by using information that is exchanged between network devices through an X2 interface.

In this embodiment of the present disclosure, the first information indicates whether the terminal device has the capability of supporting the random access-free uplink synchronization. When the terminal device has the capability of supporting the random access-free uplink synchronization, the terminal device is a static terminal device or a dynamic terminal device. When the terminal device is a dynamic terminal device, when configuring the TA indication list of the group of cells for the terminal device, the network device further delivers a timer used to indicate a validity period of the TA indication list of the group of cells.

In a possible design, before the receiving, by the network device, location information of the terminal device and first information that is reported by the terminal device, the method further includes: sending, by the network device, a downlink synchronization message to the terminal device.

In this embodiment of the present disclosure, the network device sends the downlink synchronization message, and the terminal device detects the downlink synchronization message, to complete downlink synchronization with the network device.

In a possible design, the TA indication list of the group of cells includes a cell identity and a TA value corresponding to the cell identity.

In a possible design, the TA indication list of the group of cells further includes a common resource pool corresponding to the group of cells, and the network device receives, by using a resource in the common resource pool, the uplink RRC message sent by the terminal device.

In this embodiment of the present disclosure, a process of requesting an uplink resource through random access is not performed between the network device and the terminal device, to reduce signaling and a latency, and improve efficiency of sending the uplink RRC message.

In a possible design, the TA indication list of the group of cells further includes a resource pool corresponding to the cell identity, and the network device receives, by using a resource in the resource pool, the uplink RRC message sent by the terminal device.

In this embodiment of the present disclosure, the resource used by the network device to receive the uplink RRC message is corresponding to the cell identity, to educe transmission collision due to resource sharing between cells, and improve efficiency of sending the uplink RRC message.

According to a third aspect, an embodiment of the present disclosure proposes a terminal device or a chip in a terminal device. The terminal device or the chip has a function of implementing the data communication method in the first aspect or any possible design of the first aspect. The function may be implemented by using hardware, or may be implemented by hardware executing corresponding software. The hardware or the software includes one or more units corresponding to the foregoing function.

The terminal device includes a processing unit and a transceiver unit. The processing unit may be a processor, the transceiver unit may be a transceiver, and the transceiver includes a radio frequency circuit. Optionally, the terminal device further includes a storage unit, and the storage unit may be, for example, a memory. When the terminal device includes the storage unit, the storage unit is configured to store a computer executable instruction. The processing unit is connected to the storage unit, and the processing unit executes the computer executable instruction stored in the storage unit, so that the terminal device performs the data communication method in the first aspect or any possible design of the first aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip performs the data communication method in the first aspect or any possible design of the first aspect. Optionally, the storage unit may be a storage unit (for example, a register or a buffer) in the chip, or the storage unit may be a storage unit (for example, a read-only memory (ROM)) that is located outside the chip in the terminal device, another type of static storage device (for example, a random access memory (RAM)) that can store static information and an instruction, or the like.

The processor in the third aspect may be a central processing unit (CPU), a microprocessor, or an application-specific integrated circuit (ASIC), or may be one or more integrated circuits configured to control execution of a program for the data communication method in the first aspect or any possible design of the first aspect.

According to a fourth aspect, an embodiment of the present disclosure proposes a network device or a chip in a network device. The network device or the chip has a function of implementing the data communication method in the second aspect or any possible design of the second aspect. The function may be implemented by using hardware, or may be implemented by hardware executing corresponding software. The hardware or the software includes one or more units corresponding to the foregoing function.

The network device includes a processing unit and a transceiver unit. The processing unit may be a processor, the transceiver unit may be a transceiver, and the transceiver includes a radio frequency circuit. Optionally, the network device further includes a storage unit, and the storage unit may be, for example, a memory. When the network device includes the storage unit, the storage unit is configured to store a computer executable instruction. The processing unit is connected to the storage unit, and the processing unit executes the computer executable instruction stored in the storage unit, so that the network device performs the data communication method in the second aspect or any possible design of the second aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip performs the data communication method in the second aspect or any possible design of the second aspect. Optionally, the storage unit may be a storage unit (for example, a register or a buffer) in the chip, or the storage unit may be a storage unit (for example, a read-only memory (ROM)) that is located outside the chip in the network device, another type of static storage device (for example, a random access memory (RAM)) that can store static information and an instruction, or the like.

The processor in the fourth aspect may be a central processing unit (CPU), a microprocessor, or an application-specific integrated circuit (ASIC), or may be one or more integrated circuits configured to control execution of a program for the data communication method in the second aspect or any possible design of the second aspect.

According to a fifth aspect, an embodiment of the present disclosure proposes a communications system. The communications system includes the terminal device in the third aspect and the network device in the fourth aspect.

According to a sixth aspect, an embodiment of the present disclosure proposes a computer storage medium. The computer storage medium stores program code, and the program code is used to indicate an instruction for performing the data communication method in either of the first aspect and the second aspect or any possible design of the first aspect or the second aspect.

According to a seventh aspect, an embodiment of the present disclosure proposes a computer program product including an instruction. When the computer program product runs on a computer, the computer is enabled to perform the data communication method in either of the first aspect and the second aspect or any possible design of the first aspect or the second aspect.

DESCRIPTION OF EMBODIMENTS

The following further describes the embodiments of the present disclosure in detail with reference to the accompanying drawings of this specification. It should be understood that the embodiments described herein are merely used to explain the present disclosure but are not intended to limit the present disclosure.

Figure 1:
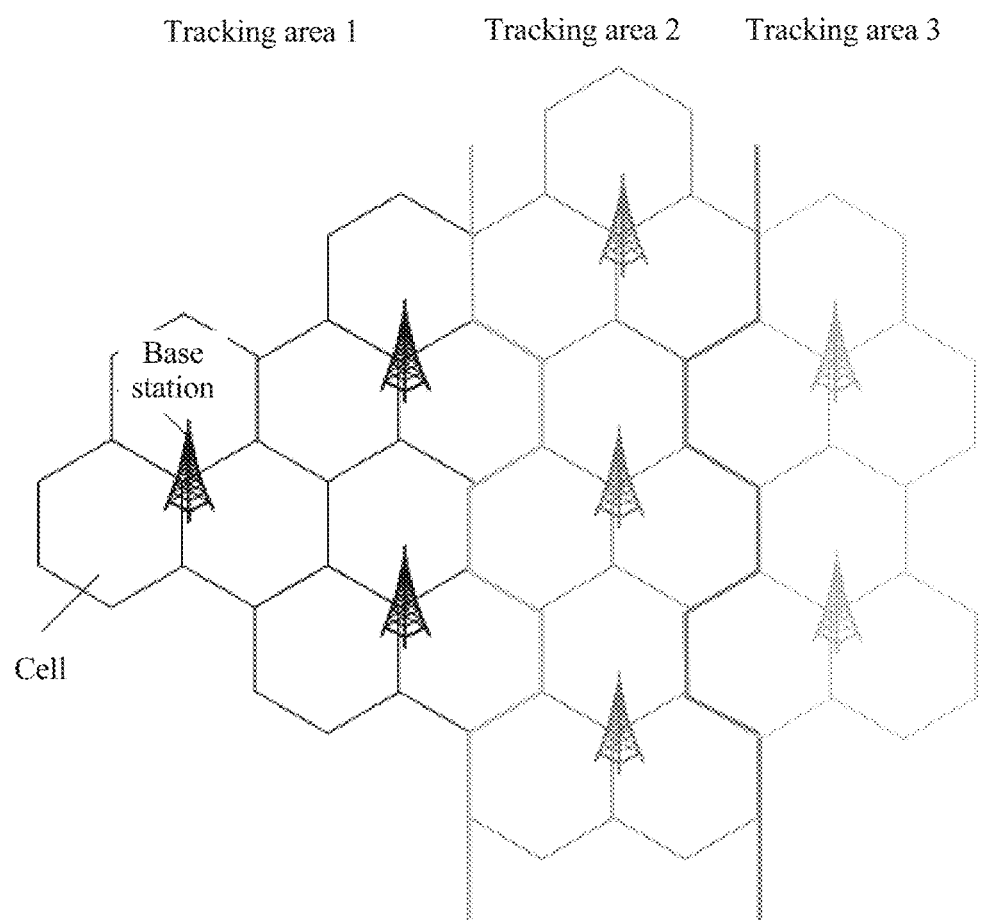
FIG. 1 is a schematic diagram of a network architecture according to an embodiment of the present disclosure.

A network architecture shown in FIG. 1 includes a plurality of tracking areas, namely, a plurality of groups of cells, and there are a plurality of base stations and a plurality of cells in each tracking area. A terminal device in any cell in any tracking area may be switched from an idle mode to a connected mode. In the prior art, a latency for switching the terminal device from an idle mode to a connected mode is high. Therefore, the embodiments of the present disclosure propose a data communication method for reducing a latency.

Figure 2:
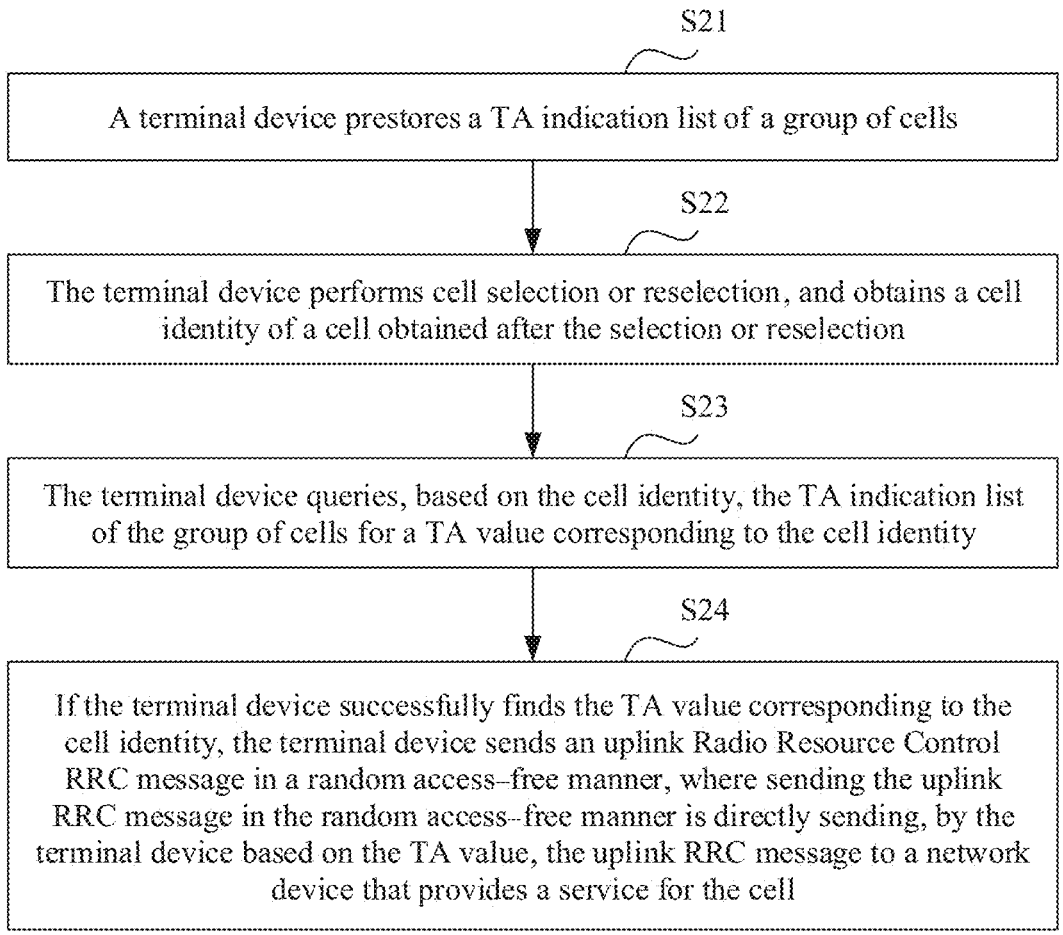
FIG. 2 is a schematic flowchart of a data communication method according to an embodiment of the present disclosure.

An embodiment of the present disclosure provides a data communication method. As shown in FIG. 2, the method includes the following process.

S21. A terminal device stores a TA indication list of a group of cells.

S22. The terminal device performs cell selection or reselection, and obtains a cell identity of a cell obtained after the selection or reselection.

Optionally, the terminal device selects a cell in which the terminal device is originally located, or the terminal device selects, in the group of cells, another cell different from a cell in which the terminal device is originally located.

S23. The terminal device queries, based on the cell identity, the TA indication list of the group of cells for a TA value corresponding to the cell identity.

S24. If the terminal device successfully finds, in the TA indication list of the group of cells, the TA value corresponding to the cell identity, the terminal device sends an uplink Radio Resource Control (RRC) message in a random access-free manner, where sending the uplink RRC message in the random access-free manner is directly sending, by the terminal device based on the TA value, the uplink RRC message to a network device that provides a service for the cell obtained after the selection or reselection.

Optionally, the terminal device sends the uplink RRC message in a contention access manner.

Optionally, the uplink RRC message is a Radio Resource Control connection resume request (RRC connection resume request) message, a Radio Resource Control connection setup request (RRC connection setup request) message, or a Radio Resource Control connection reestablishment request (RRC connection reestablishment request) message.

In this embodiment of the present disclosure, the terminal device queries the stored TA indication list of the group of cells for the TA value corresponding to the cell identity of the cell obtained after the selection or reselection, and sends, based on the TA value, the uplink Radio Resource Control (RRC) message in the random access-free manner without a need to obtain the TA value by using a random access process. This reduces a latency for switching the terminal device from an idle mode to a connected mode.

In a possible implementation, before step S21, the method further includes: receiving, by the terminal device, the timing advance (TA) indication list of the group of cells sent by the network device.

Optionally, the TA indication list of the group of cells is carried in a broadcast message or a control message that is sent by the network device and that is received by the terminal device, where the control message is an RRC connection release message or a Medium Access Control control element (MAC CE).

In another possible implementation, before step S21, the method further includes: generating, by the terminal device, the timing advance (TA) indication list of the group of cells based on historical residence information.

Optionally, the TA indication list of the group of cells includes a cell identity and a TA value corresponding to the cell identity.

Optionally, the TA indication list of the group of cells further includes a common resource pool corresponding to the group of cells, and a resource in the common resource pool is used by the terminal device to send the uplink RRC message.

Optionally, the TA indication list of the group of cells further includes a resource pool corresponding to the cell identity, and a resource in the resource pool is used by the terminal device to send the uplink RRC message.

Specifically, when the terminal device sends the uplink RRC message to the network device by using the TA value, the uplink RRC message is sent at least once by using the resource in the common resource pool or the resource in the resource pool corresponding to the cell identity.

In a possible implementation, before step S21, the terminal device reports first information to the network device, where the first information indicates whether the terminal device has a capability of supporting random access-free uplink synchronization.

Specifically, when the terminal device has the capability of supporting the random access-free uplink synchronization, the terminal device is a static terminal device or a dynamic terminal device. When the terminal device is a dynamic terminal device, the broadcast message or the control message carries both the TA indication list of the group of cells and a timer that is used to indicate a validity period of the TA indication list of the group of cells.

Figure 3:
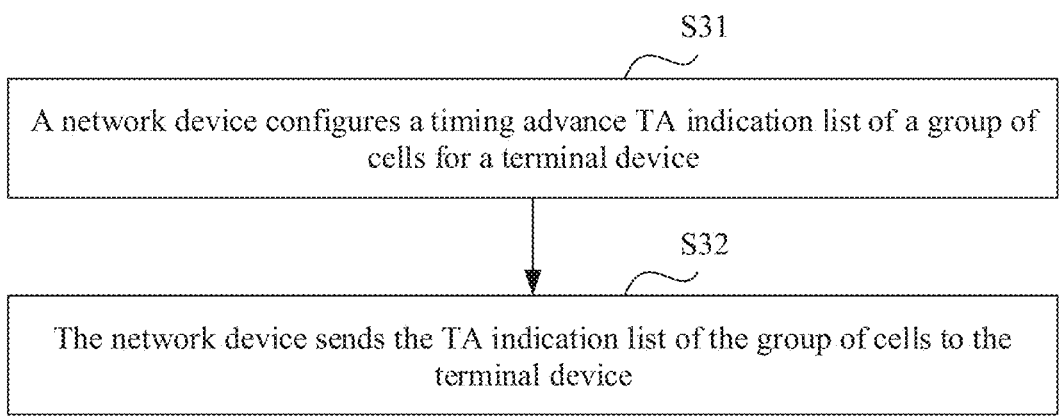
FIG. 3 is a schematic flowchart of another data communication method according to an embodiment of the present disclosure.

Based on a same disclosure concept, an embodiment of the present disclosure provides a data communication method. As shown in FIG. 3, the method includes the following process.

S31. A network device configures a timing advance (TA) indication list of a group of cells for a terminal device.

In a possible implementation, before step S31, the method further includes: receiving, by the network device, location information of the terminal device and first information that is reported by the terminal device, where the first information indicates whether the terminal device has a capability of supporting random access-free uplink synchronization.

Specifically, the network device configures the TA indication list of the group of cells for the terminal device based on the location information and the first information.

Optionally, the location information is obtained by the network device through reporting of the terminal device, or obtained by the network device by using information that is exchanged between network devices through an X2 interface. The TA indication list of the group of cells is carried in a broadcast message or a control message that is sent by the network device to the terminal device.

S32. The network device sends the TA indication list of the group of cells to the terminal device.

In this embodiment of the present disclosure, the network device configures the TA indication list of the group of cells for the terminal device; and the terminal device queries the TA indication list of the group of cells for a TA value corresponding to a cell identity of a cell obtained after selection or reselection, and sends, based on the TA value, an uplink Radio Resource Control (RRC) message in a random access-free manner without a need to obtain the TA value by using a random access process. This reduces a latency for switching the terminal device from an idle mode to a connected mode.

In a possible implementation, after step S32, the method further includes: receiving, by the network device, an uplink Radio Resource Control (RRC) message that is sent by the terminal device in a random access-free manner, where the random access-free means that the network device directly receives the uplink RRC message.

In a possible implementation, the TA indication list of the group of cells includes a cell identity and a TA value corresponding to the cell identity.

In a possible implementation, the TA indication list of the group of cells further includes a common resource pool corresponding to the group of cells, and the network device receives, by using a resource in the common resource pool, the uplink RRC message sent by the terminal device.

In a possible implementation, the TA indication list of the group of cells further includes a resource pool corresponding to the cell identity, and the network device receives, by using a resource in the resource pool, the uplink RRC message sent by the terminal device.

The following describes in detail the data communication method in the embodiments of the present disclosure by using two specific embodiments and an interaction process between a network device and a terminal device.

Figure 4:
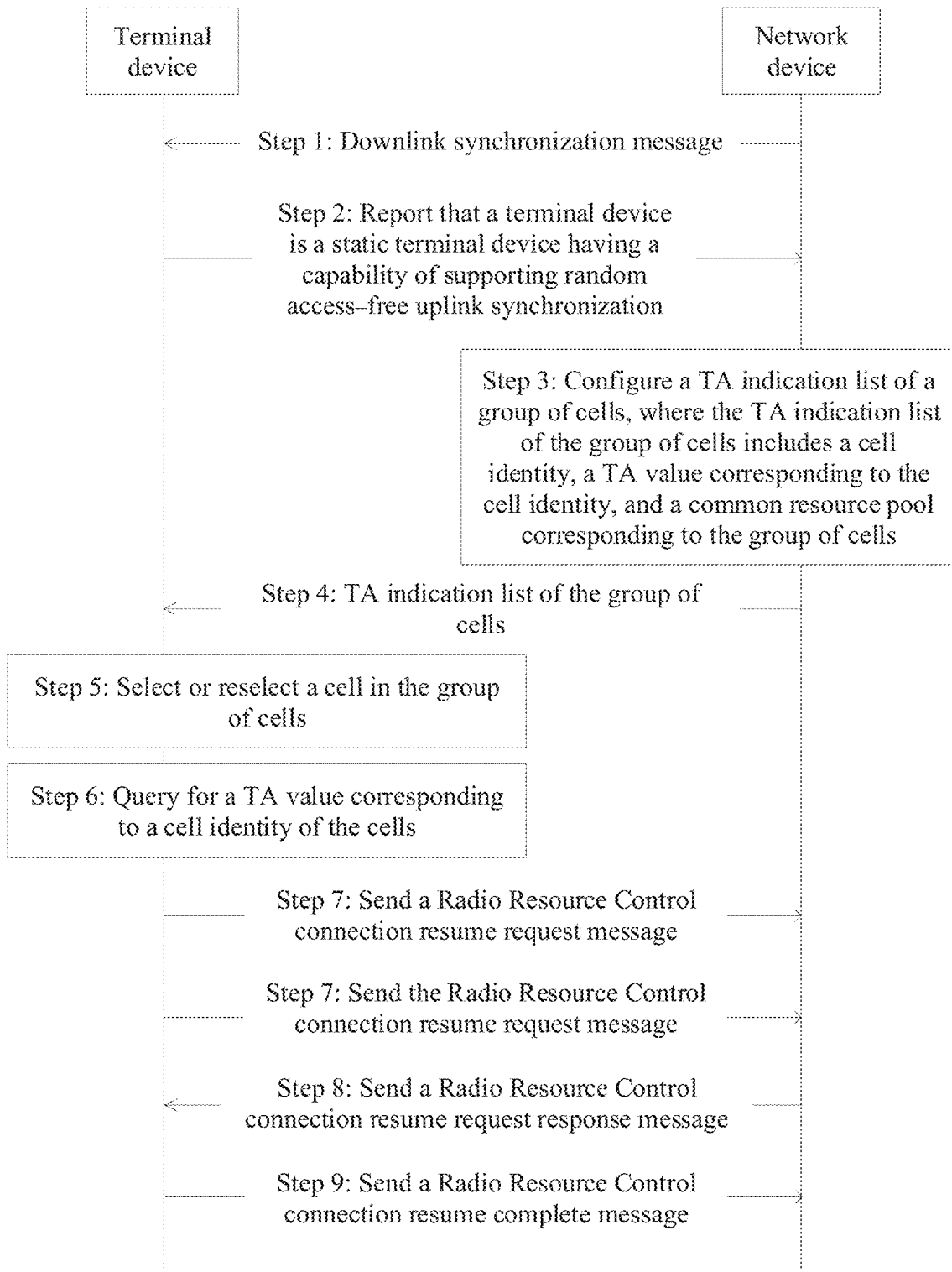
FIG. 4 is a schematic flowchart of still another data communication method according to an embodiment of the present disclosure.

Embodiment 1: When an RRC connection between a terminal device and a network device that provides a service for a cell in which the terminal device is originally located is resumed, a specific process is shown in FIG. 4 and includes the following steps.

Step 1: The terminal device detects a downlink synchronization message sent by the network device, to complete downlink synchronization with the network device.

Step 2: The terminal device reports that the terminal device is a static terminal device having a capability of supporting random access-free uplink synchronization.

Step 3: The network device configures a TA indication list of a group of cells for the terminal device, where the TA indication list of the group of cells includes a cell identity, a TA value corresponding to the cell identity, and a common resource pool corresponding to the group of cells, and a configuration format of the TA indication list of the group of cells is: (Cell index 1, Timing advance 1), (Cell index 2, Timing advance 2), . . . , (Cell index n, Timing advance n), resource pool. The cell index n is a cell identity of an $n^{th}$ cell in the TA indication list, the timing advance n is a TA value corresponding to the cell identity of the $n^{th}$ cell in the TA indication list, and the resource pool is the common resource pool corresponding to the group of cells in the TA indication list.

Step 4: The network device sends the TA indication list of the group of cells to the terminal device.

Step 5: The terminal device selects or reselects a cell in the group of cells, where the cell is the cell in which the terminal device is originally located.

Step 6: The terminal device queries the TA indication list of the group of cells for a TA value corresponding to a cell identity of the cell.

Step 7: The terminal device sends an RRC connection resume request message at least once based on the TA value.

Step 8: The network device sends an RRC connection resume request response message.

Step 9: After receiving the RRC connection resume request response message, the terminal device stops sending the RRC connection resume request message, and sends an RRC connection resume complete message to the network device.

Figure 5:
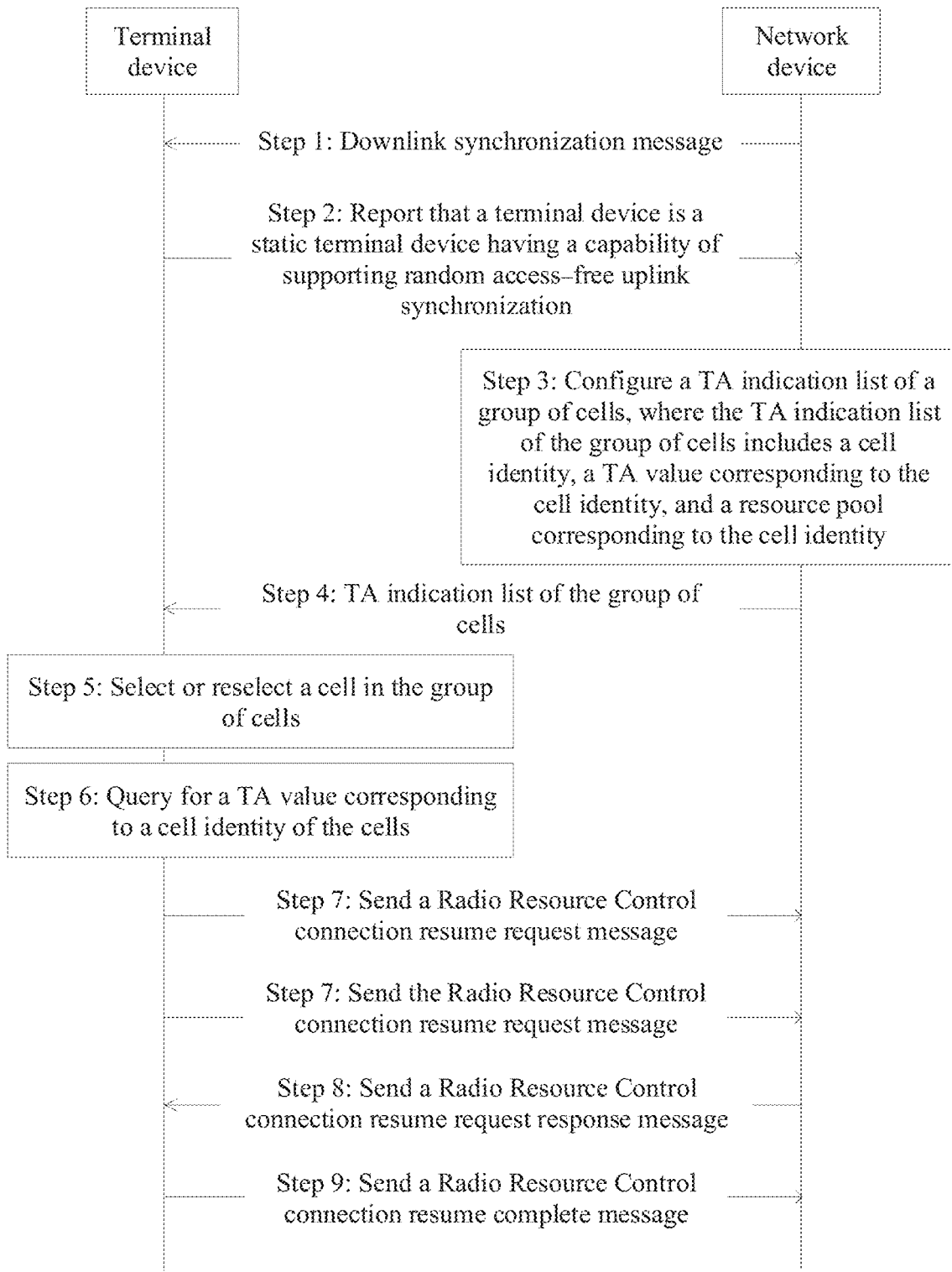
FIG. 5 is a schematic flowchart of yet another data communication method according to an embodiment of the present disclosure.

Embodiment 2: When an RRC connection between a terminal device and a network device that provides a service for a cell in which the terminal device is originally located is resumed, another specific process is shown in FIG. 5 and includes the following steps.

Step 1: The terminal device detects a downlink synchronization message sent by the network device, to complete downlink synchronization with the network device.

Step 2: The terminal device reports that the terminal device is a static terminal device having a capability of supporting random access-free uplink synchronization.

Step 3: The network device configures a TA indication list of a group of cells for the terminal device, where the TA indication list of the group of cells includes a cell identity, a TA value corresponding to the cell identity, and a resource pool corresponding to the cell identity, and a configuration format of the TA indication list of the group of cells is: (Cell index 1, Timing advance 1, Resource pool 1), (Cell index 2, Timing advance 2, Resource pool 2), . . . , (Cell index n, Timing advance n, Resource pool n). The cell index n is a cell identity of an $n^{th}$ cell in the TA indication list, the timing advance n is a TA value corresponding to the cell identity of the $n^{th}$ cell in the TA indication list, and the resource pool n is a resource pool corresponding to the cell identity of the $n^{th}$ cell in the TA indication list.

Step 4: The network device sends the TA indication list of the group of cells to the terminal device.

Step 5: The terminal device selects or reselects a cell in the group of cells, where the cell is the cell in which the terminal device is originally located.

Step 6: The terminal device queries the TA indication list of the group of cells for a TA value corresponding to a cell identity of the cell.

Step 7: The terminal device sends an RRC connection resume request message at least once based on the TA value.

Step 8: The network device sends an RRC connection resume request response message.

Step 9: After receiving the RRC connection resume request response message, the terminal device stops sending the RRC connection resume request message, and sends an RRC connection resume complete message to the network device.

Figure 6:
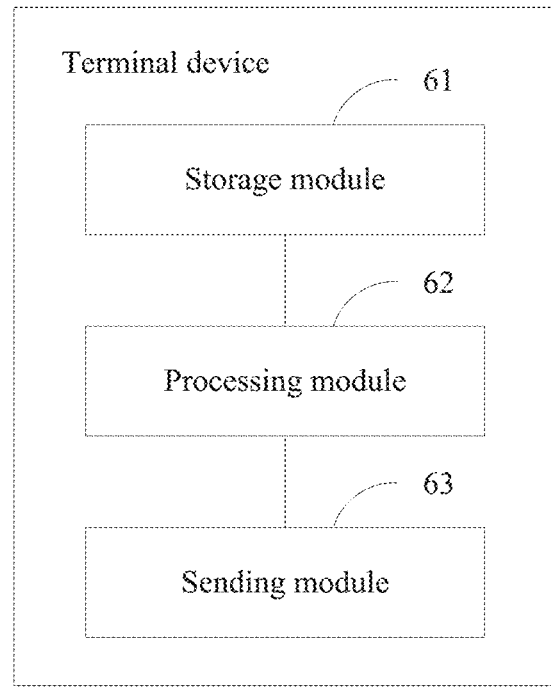
FIG. 6 is a schematic structural diagram of a terminal device according to an embodiment of the present disclosure.

Based on a same disclosure concept, an embodiment of the present disclosure provides a terminal device. As shown in FIG. 6, the terminal device includes:
- a storage module 61, configured to prestore a TA indication list of a group of cells;
- a processing module 62, configured to: perform cell selection or reselection, and obtain a cell identity of a cell obtained after the selection or reselection, where
- the processing module 62 is further configured to query, based on the cell identity, the TA indication list of the group of cells for a TA value corresponding to the cell identity; and
- a sending module 63, configured to: if the processing module successfully finds the TA value corresponding to the cell identity, send an uplink Radio Resource Control (RRC) message in a random access-free manner, where sending the uplink RRC message in the random access-free manner is directly sending, by the sending module based on the TA value, the uplink RRC message to a network device that provides a service for the cell.

In this embodiment of the present disclosure, the terminal device queries the stored TA indication list of the group of cells for the TA value corresponding to the cell identity of the cell obtained after the selection or reselection, and sends, based on the TA value, the uplink Radio Resource Control (RRC) message in the random access-free manner without a need to obtain the TA value by using a random access process. This reduces a latency for switching the terminal device from an idle mode to a connected mode.

In a possible implementation, before the storage module prestores the TA indication list of the group of cells, the terminal device further includes:
- a receiving module, configured to receive the TA indication list of the group of cells that is included in a broadcast message sent by the network device; or
- the receiving module is further configured to receive the TA indication list of the group of cells that is included in a control message sent by the network device, where the control message is a Radio Resource Control connection release message or a Medium Access Control control element.

In another possible implementation, before the storage module prestores the TA indication list of the group of cells, the terminal device further includes:
- the processing module generates the TA indication list of the group of cells based on historical residence information.

Optionally, the directly sending, by the sending module based on the TA value, the uplink RRC message to a network device that provides a service for the cell includes: sending, by the sending module, the uplink RRC message in a contention access manner.

Optionally, the uplink RRC message is a connection resume request message, connection setup request message, or connection reestablishment request message.

Optionally, before the storage module prestores the TA indication list of the group of cells, the terminal device further includes:
- the sending module is further configured to report first information to the network device, where the first information indicates whether the terminal device has a capability of supporting random access-free uplink synchronization.

Optionally, the TA indication list of the group of cells includes a cell identity and a TA value corresponding to the cell identity.

Optionally, the TA indication list of the group of cells further includes a common resource pool corresponding to the group of cells, and a resource in the common resource pool is used by the sending module 63 to send the uplink RRC message.

Optionally, the TA indication list of the group of cells further includes a resource pool corresponding to the cell identity, and a resource in the resource pool is used by the sending module to send the uplink RRC message.

Optionally, the directly sending, by the sending module based on the TA value, the uplink RRC message to a network device that provides a service for the cell includes: sending, by the sending module, the uplink RRC message based on the TA value and by using the resource in the common resource pool or the resource in the resource pool corresponding to the cell identity.

Figure 7:
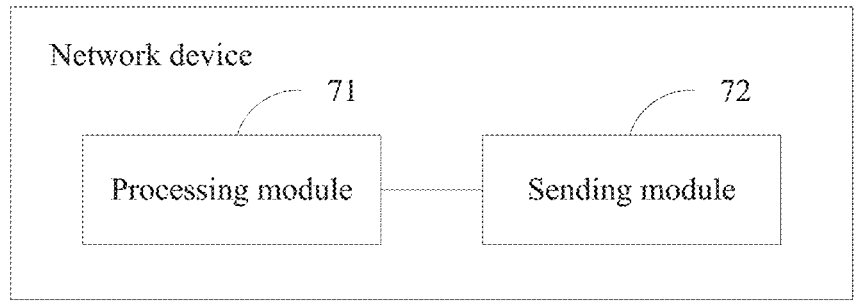
FIG. 7 is a schematic structural diagram of a network device according to an embodiment of the present disclosure.

Based on a same disclosure concept, an embodiment of the present disclosure provides a network device. As shown in FIG. 7, the network device includes:
- a processing module 71, configured to configure a timing advance (TA) indication list of a group of cells for a terminal device; and
- a sending module 72, configured to send the TA indication list of the group of cells to the terminal device.

In this embodiment of the present disclosure, the network device configures the TA indication list of the group of cells for the terminal device; and the terminal device queries the TA indication list of the group of cells for a TA value corresponding to a cell identity of a cell obtained after selection or reselection, and sends, based on the TA value, an uplink Radio Resource Control (RRC) message in a random access-free manner without a need to obtain the TA value by using a random access process. This reduces a latency for switching the terminal device from an idle mode to a connected mode.

Optionally, that the sending module is configured to send the TA indication list of the group of cells to the terminal device includes: the sending module adds the TA indication list of the group of cells to a broadcast message, and sends the broadcast message to the terminal device; or the sending module adds the TA indication list of the group of cells to a control message, and sends the control message to the terminal device, where the control message is an RRC connection release message or a Medium Access Control control element.

Optionally, the network device further includes a receiving module, configured to receive an uplink Radio Resource Control (RRC) message that is sent by the terminal device in a random access-free manner, where the random access-free means that the network device directly receives the uplink RRC message.

Optionally, the receiving module is further configured to receive location information of the terminal device and first information that is reported by the terminal device, where the first information indicates whether the terminal device has a capability of supporting random access-free uplink synchronization.

Optionally, that the processing module is configured to configure the timing advance (TA) indication list of the group of cells for the terminal device includes: the processing module configures the TA indication list of the group of cells for the terminal device based on the location information and the first information.

Optionally, the location information is obtained by the network device through reporting of the terminal device, or obtained by the network device by using information that is exchanged between network devices through an X2 interface.

Optionally, the TA indication list of the group of cells includes a cell identity and a TA value corresponding to the cell identity.

Optionally, the TA indication list of the group of cells further includes a common resource pool corresponding to the group of cells, and the receiving module receives, by using a resource in the common resource pool, the uplink RRC message sent by the terminal device.

Optionally, the TA indication list of the group of cells further includes a resource pool corresponding to the cell identity, and the receiving module receives, by using a resource in the resource pool, the uplink RRC message sent by the terminal device.

The following describes a structure and a processing manner of the terminal device in the embodiments of the present disclosure with reference to a hardware structure.

Figure 8:
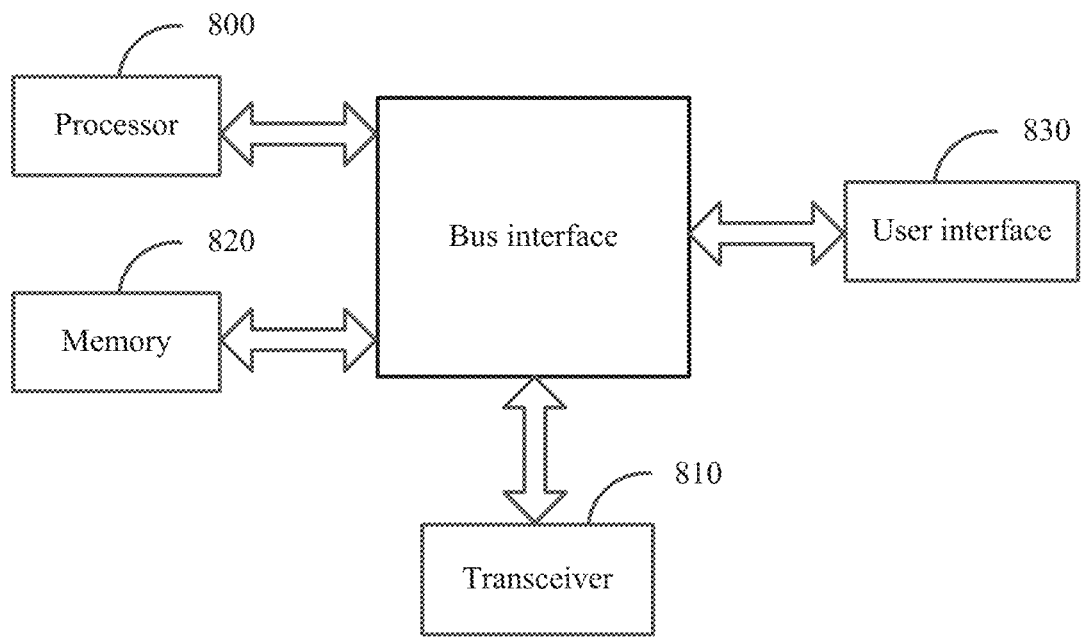
FIG. 8 is a schematic diagram of a hardware structure of a terminal device according to an embodiment of the present disclosure.

In an embodiment corresponding to FIG. 8, a terminal device includes a transceiver 810 and at least one processor 800 connected to the transceiver 810.

The processor 800 is configured to read a program from a memory 820, to perform the following process.

If the terminal device successfully finds, in a TA indication list of a group of cells, a TA value corresponding to a cell identity, the transceiver sends an uplink Radio Resource Control (RRC) message in a random access-free manner, where sending the uplink RRC message in the random access-free manner is directly sending, by the terminal device based on the TA value, the uplink RRC message to a network device that provides a service for a cell.

The transceiver 810 is configured to receive and send data.

The memory 820 is configured to store the data and the program.

The memory 820 is further configured to store the TA indication list of the group of cells.

The processor 800 is further configured to perform the following process: performing cell selection or reselection, and obtaining a cell identity of a cell obtained after the selection or reselection; and querying, based on the cell identity, the TA indication list of the group of cells for a TA value corresponding to the cell identity.

In FIG. 8, a bus architecture may include any quantity of interconnected buses and bridges. Specifically, various circuits of one or more processors represented by the processor 800 and a memory represented by the memory 820 are connected. The bus architecture may further connect various other circuits such as a peripheral device, a voltage stabilizer, and a power management circuit. These are commonly known in the art, and therefore are not further described in this specification. A bus interface provides an interface. The transceiver 810 may be a plurality of elements. To be specific, the transceiver 810 includes a transmitter and a receiver, and provides a unit configured to communicate with various other apparatuses on a transmission medium. For different user equipment, a user interface 830 may be an interface that can be externally or internally connected to a needed device, and the connected device includes but is not limited to a keypad, a display, a loudspeaker, a microphone, and a joystick. The processor 800 is responsible for managing the bus architecture and general processing, and the memory 820 may store data used when the processor 800 performs an operation.

Optionally, the transceiver 810 is further configured to receive the TA indication list of the group of cells that is included in a broadcast message sent by the network device, or the transceiver 810 is further configured to receive the TA indication list of the group of cells that is included in a control message sent by the network device, where the control message is an RRC connection release message or a Medium Access Control control element.

Optionally, the directly sending, by the transceiver 810 based on the TA value, the uplink RRC message to a network device that provides a service for the cell includes: sending, by the transceiver 810, the uplink RRC message in a contention access manner.

Optionally, the uplink RRC message is a connection resume request message, connection setup request message, or connection reestablishment request message.

Optionally, before the memory 820 prestores the TA indication list of the group of cells, the terminal device further includes: the transceiver 810 is further configured to report first information to the network device, where the first information indicates whether the terminal device has a capability of supporting random access-free uplink synchronization.

Optionally, the TA indication list of the group of cells includes a cell identity and a TA value corresponding to the cell identity.

Optionally, the TA indication list of the group of cells further includes a common resource pool corresponding to the group of cells, and a resource in the common resource pool is used by the transceiver 810 to send the uplink RRC message.

Optionally, the TA indication list of the group of cells further includes a resource pool corresponding to the cell identity, and a resource in the resource pool is used by the transceiver 810 to send the uplink RRC message.

Optionally, the directly sending, by the transceiver 810 based on the TA value, the uplink RRC message to a network device that provides a service for the cell includes: the transceiver 810 sends the uplink RRC message based on the TA value and by using the resource in the common resource pool or the resource in the resource pool corresponding to the cell identity.

Figure 9:
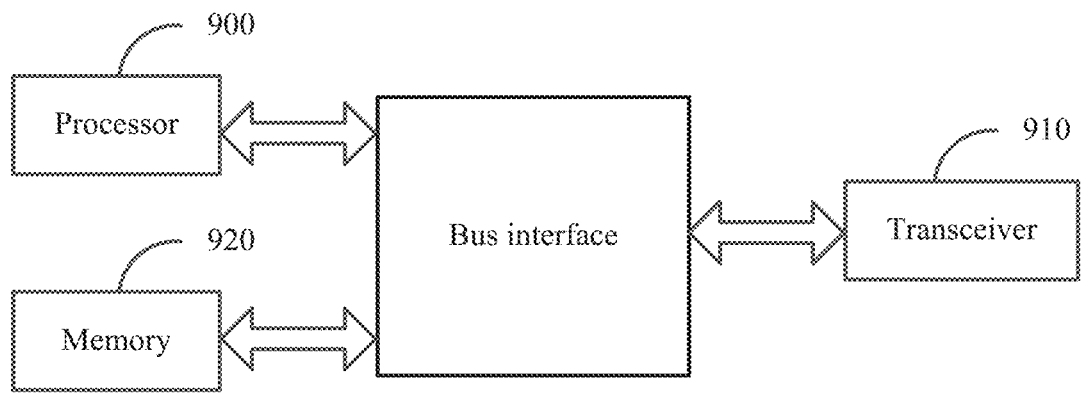
FIG. 9 is a schematic diagram of a hardware structure of a network device according to an embodiment of the present disclosure.

In an embodiment corresponding to FIG. 9, a network device includes a transceiver 910 and at least one processor 900 connected to the transceiver 910.

The processor 900 is configured to read a program from a memory 920, to perform the following process.

The processor 900 configures a timing advance (TA) indication list of a group of cells for a terminal device.

The transceiver 910 is configured to receive and send data.

The transceiver 910 sends the TA indication list of the group of cells to the terminal device.

In FIG. 9, a bus architecture may include any quantity of interconnected buses and bridges. Specifically, various circuits of one or more processors represented by the processor 900 and a memory represented by the memory 920 are connected. The bus architecture may further connect various other circuits such as a peripheral device, a voltage stabilizer, and a power management circuit. These are commonly known in the art, and therefore are not further described in this specification. A bus interface provides an interface. The transceiver 910 may be a plurality of elements. To be specific, the transceiver 910 includes a transmitter and a receiver, and provides a unit configured to communicate with various other apparatuses on a transmission medium. The processor 900 is responsible for managing the bus architecture and general processing, and the memory 920 may store data used when the processor 900 performs an operation.

Optionally, that the transceiver 910 is configured to send the TA indication list of the group of cells to the terminal device includes: the transceiver 910 adds the TA indication list of the group of cells to a broadcast message, and sends the broadcast message to the terminal device; or the transceiver 910 adds the TA indication list of the group of cells to a control message, and sends the control message to the terminal device, where the control message is an RRC connection release message or a Medium Access Control control element.

Optionally, the transceiver 910 is further configured to receive an uplink Radio Resource Control (RRC) message that is sent by the terminal device in a random access-free manner, where the random access-free means that the network device directly receives the uplink RRC message.

Optionally, the transceiver 910 is further configured to receive location information of the terminal device and first information that is reported by the terminal device, where the first information indicates whether the terminal device has a capability of supporting random access-free uplink synchronization.

Optionally, that the processor 900 is configured to configure the timing advance (TA) indication list of the group of cells for the terminal device includes: the processor 900 configures the TA indication list of the group of cells for the terminal device based on the location information and the first information.

Optionally, the location information is obtained by the network device through reporting of the terminal device, or obtained by the network device by using information that is exchanged between network devices through an X2 interface.

Optionally, the TA indication list of the group of cells includes a cell identity and a TA value corresponding to the cell identity.

Optionally, the TA indication list of the group of cells further includes a common resource pool corresponding to the group of cells, and the transceiver 910 receives, by using a resource in the common resource pool, the uplink RRC message sent by the terminal device.

Optionally, the TA indication list of the group of cells further includes a resource pool corresponding to the cell identity, and the transceiver 910 receives, by using a resource in the resource pool, the uplink RRC message sent by the terminal device.

A person skilled in the art should understand that the embodiments of the present disclosure may be provided as a method, a system, or a computer program product. Therefore, the present disclosure may use a form of hardware only embodiments, software only embodiments, or embodiments combining software and hardware. Moreover, the present disclosure may use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the embodiments of the present disclosure. It should be understood that computer program instructions may be used to implement each process in the flowcharts and/or each block in the block diagrams and a combination of a process in the flowcharts and/or a block in the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, a person skilled in the art can make changes and modifications to these embodiments once learning the basic inventive concept. Therefore, the following claims are intended to be construed as to cover the embodiments and all changes and modifications that fall within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of the following claims and equivalent technologies of the present disclosure.

What is claimed is:

1. A data communication method, the method comprising:
reporting, by a terminal device to a network device, first information indicating whether the terminal device is capable of supporting random access-free uplink synchronization;
receiving, by the terminal device from the network device, a control message comprising a time advance (TA) indication list of a group of cells, wherein the control message is an RRC connection release message, and wherein the control message further comprises information indicating a validity period of the TA indication list of the group of cells;
prestoring, by the terminal device, the TA indication list of the group of cells, the TA indication list of the group of cells comprising at least one resource pool corresponding to the group of cells, and the TA indication list having been configured based at least on the first information;
performing, by the terminal device, cell selection or reselection, and obtaining a cell identity of a first cell based on the cell selection or the reselection;

querying, by the terminal device based on the cell identity, the TA indication list of the group of cells for a TA value corresponding to the cell identity; and sending, in response to finding the TA value corresponding to the cell identity, by the terminal device to the network device, an uplink Radio Resource Control (RRC) message in a random access-free manner by directly sending, by the terminal device according to the TA value corresponding to the cell identity and using a resource indicated by the at least one resource pool, the uplink RRC message, wherein the network device provides a service for the first cell.

2. The data communication method according to claim 1, wherein sending the uplink RRC message comprises sending the uplink RRC message in a contention access manner.

3. The data communication method according to claim 1, wherein the uplink RRC message is a connection resume request message.

4. A data communication method, the method comprising:
receiving, by a network device from a terminal device, first information indicating whether the terminal device is capable of supporting random access-free uplink synchronization;

configuring, by the network device according to the first information, a timing advance (TA) indication list of a group of cells for the terminal device, the TA indication list of the group of cells comprising at least one resource pool corresponding to the group of cells;

sending, by the network device to the terminal device, the TA indication list of the group of cells, wherein sending the TA indication list of the group of cells comprises adding, by the network device, the TA indication list of the group of cells to a control message, and sending the control message to the terminal device, wherein the control message is an RRC connection release message, and wherein the control message further comprises information indicating a validity period of the TA indication list of the group of cells; and receiving, by the network device from the terminal device, an uplink Radio Resource Control (RRC) message in a random access-free manner according to a TA value corresponding to a first cell and using a resource indicated by the at least one resource pool, wherein the network device provides a service for the first cell.

5. The data communication method according to claim 4, wherein of receiving the uplink RRC message comprises receiving the uplink RRC message in a contention access manner.

6. The data communication method according to claim 4, wherein the uplink RRC message is a connection resume request message.

7. A data communication apparatus comprising:
a processor; and
a non-transitory storage medium comprising executable instructions which, when executed by the processor, cause the data communication apparatus to:
report, to a network device, first information indicating whether the data communication apparatus is capable of supporting random access-free uplink synchronization;
receive, from the network device, a control message comprising a time advance (TA) indication list of a group of cells, wherein the control message is an RRC connection release message, and wherein the control message further comprises information indicating a validity period of the TA indication list of the group of cells;
prestore the TA indication list of the group of cells, the TA indication list of the group of cells comprising at least one resource pool corresponding to the group of cells, and the TA indication list having been configured based at least on the first information;
perform cell selection or reselection, and obtain a cell identity of a first cell based on the cell selection or the reselection;
query, based on the cell identity, the TA indication list of the group of cells for a TA value corresponding to the cell identity; and
send, to the network device in response to finding the TA value corresponding to the cell identity, an uplink Radio Resource Control (RRC) message in a random access-free manner by directly sending, according to the TA value corresponding to the cell identity and using a resource indicated by the at least one resource pool, the uplink RRC message, wherein the network device provides a service for the first cell.

8. The data communication apparatus according to claim 7, wherein the uplink RRC message is a connection resume request message.

9. The data communication apparatus according to claim 7, wherein to send of the uplink RRC message comprises to send the uplink RRC message in a contention access manner.

10. A data communication apparatus comprising:
a processor; and
a non-transitory storage medium comprising executable instructions which, when executed by the processor, cause the data communication apparatus to:
receive, from a terminal device, first information indicating whether the terminal device is capable of supporting random access-free uplink synchronization;
configure, according to the first information, a timing advance (TA) indication list of a group of cells for the terminal device, the TA indication list of the group of cells comprising at least one resource pool corresponding to the group of cells;
send, to the terminal device, the TA indication list of the group of cells by adding the TA indication list of the group of cells to a control message, and sending the control message to the terminal device, wherein the control message is an RRC connection release message, and wherein the control message further comprises information indicating a validity period of the TA indication list of the group of cells; and
receive, from the terminal device, an uplink Radio Resource Control (RRC) message in a random access-free manner according to a TA value corresponding to a first cell and using a resource indicated by the at least one resource pool, wherein the data communication apparatus provides a service for the first cell.

11. The data communication apparatus according to claim 10, wherein to receive the uplink RRC message comprises to receive the uplink RRC message in a contention access manner.

12. The data communication apparatus according to claim 10, wherein the uplink RRC message is a connection resume request message or a connection setup request message.

* * * * *